United States Patent [19]

Gellert

[11] Patent Number: 5,421,716
[45] Date of Patent: Jun. 6, 1995

[54] INJECTION MOLDING NOZZLE WITH TWO REMOVABLE INSERTS

[76] Inventor: Jobst U. Gellert, 7A Prince Street, Georgetown, Ontario, Canada, L7G 2X1

[21] Appl. No.: 254,538

[22] Filed: Jun. 6, 1994

[30] Foreign Application Priority Data

May 11, 1994 [CA] Canada .................................. 2123360

[51] Int. Cl.⁶ .............................................. B29C 45/20
[52] U.S. Cl. .................. 425/549; 264/328.15; 425/570; 425/572
[58] Field of Search ............... 425/549, 190, 570, 572; 264/328.15

[56] References Cited

U.S. PATENT DOCUMENTS

| | | | |
|---|---|---|---|
| 4,793,795 | 12/1988 | Schmidt et al. | 425/549 |
| 5,028,227 | 7/1991 | Gellert | 425/549 |
| 5,282,735 | 2/1994 | Gellert | 425/549 |
| 5,284,436 | 2/1994 | Gellert | 425/549 |
| 5,299,928 | 4/1994 | Gellert | 425/549 |

*Primary Examiner*—Tim Heitbrink
*Attorney, Agent, or Firm*—Dalesman & Company

[57] ABSTRACT

An injection molding nozzle seal around the gate which bridges the insulative air space between the front end of the heated nozzle and the cooled mold. The nozzle seal is provided by two removable inserts mounted in alignment with the central melt bore through the nozzle to convey the melt therethrough forwardly to the gate leading to the cavity. The first insert is screwed into a threaded seat in the front end of the nozzle and the second insert is screwed onto the first insert. The inserts each have a hexagonal portion for engagement by a wrench. Both of the engagement portions extend in the air space around the nozzle which facilitates removal of the inserts for cleaning or replacement without disassembling the mold.

5 Claims, 3 Drawing Sheets

INJECTION MOLDING NOZZLE WITH TWO REMOVABLE INSERTS

BACKGROUND OF THE INVENTION

This invention relates generally to injection molding and more particularly to a heated nozzle having a nozzle seal provided by two removable inserts.

It is well known to seat a heated nozzle in a cooled mold with an insulative air space between them and to bridge the insulative air space by a nozzle seal removably mounted in the front end of the nozzle. An example where the nozzle seal has a prying flange for removal is shown in U.S. Pat. No. 5,028,227 to Gellert et al. which issued Jul. 2, 1991. Another example where the nozzle seal, which is also a gate insert, is screwed into the front end of the nozzle is seen in U.S. Pat. No. 4,793,795 to Schmidt et al. which issued Dec. 27, 1988. The applicant's U.S. Pat. No. 5,282,735 which issued Feb. 1, 1994 shows that it is also known to use a nozzle seal to securely retain a torpedo in place in a seat in the front end of a nozzle. The applicant's U.S. Pat. No. 5,284,436 which issued Feb. 8, 1994 shows a torpedo which also forms the nozzle seal with a separate gate insert seated in the mold. The applicant's U.S. Pat. No. 5,299,928 which issued Apr. 5, 1994 shows a two-piece nozzle seal with the inner piece being secured in place by a threaded outer piece.

While some of these previous arrangements deal with the removal of one piece, there is no provision for convenient removal of a nozzle seal having two pieces. Convenient removal for cleaning and for replacement due to wear and corrosion or to change the gate size in the case of a gate insert is very important. It is time consuming and costly if sticking occurs and disassembly of the mold is required to remove the nozzle seal.

SUMMARY OF THE INVENTION

Accordingly, it is an object of the present invention to at least partially overcome the disadvantages of the prior art by providing injection molding apparatus in which a nozzle seal is provided by two easily removable inserts mounted in alignment at the front end of the nozzle.

To this end, in one of its aspects, the invention provides injection molding apparatus comprising at least one heated nozzle having a rear end, a front end, and a central melt bore extending therethrough from the rear end to the front end, the at least one heated nozzle being seated in a surrounding cooled mold with an insulative air space extending between the at least one heated nozzle and the surrounding cooled mold and the central melt bore of the nozzle extending in alignment with a gate to a cavity, a first insert having an outer collar with a threaded rear portion, an intermediate portion, and a melt conduit therethrough, the threaded rear portion of the outer collar of the first insert being removably received in a threaded seat in the front end of the at least one nozzle with the melt conduit through the first insert in alignment with the central melt bore of the nozzle, the intermediate portion of the outer collar of the first insert having a plurality of symmetrical flat outer faces extending therearound, the intermediate portion extending in the air space between the at least one nozzle and the mold for engagement by a suitable tool to rotate the first insert for removable mounting in the threaded seat in the front end of the at least one nozzle, and a second insert having a rearward end, a forward end, and a central opening extending therethrough from the rearward end to the forward end, the forward end of the second insert being located in the mold with the central opening through the second insert also in alignment with the central melt bore of the nozzle, the improvement comprising the outer collar of the first insert having a threaded front portion, the second insert having a threaded surface to engage the threaded front portion of the outer collar of the first insert, and the second insert having an engagement portion with a plurality of symmetrical flat outer faces extending therearound adjacent the rearward end, the engagement portion extending in the air space between the at least one nozzle and the mold for engagement by a suitable tool to rotate the second insert relative to the first insert for removable connection to the threaded front portion of the outer collar of the first insert.

Further objects and advantages of the invention will appear from the following description taken together with the accompanying drawings.

DETAILED DESCRIPTION OF THE INVENTION

Figure 1:
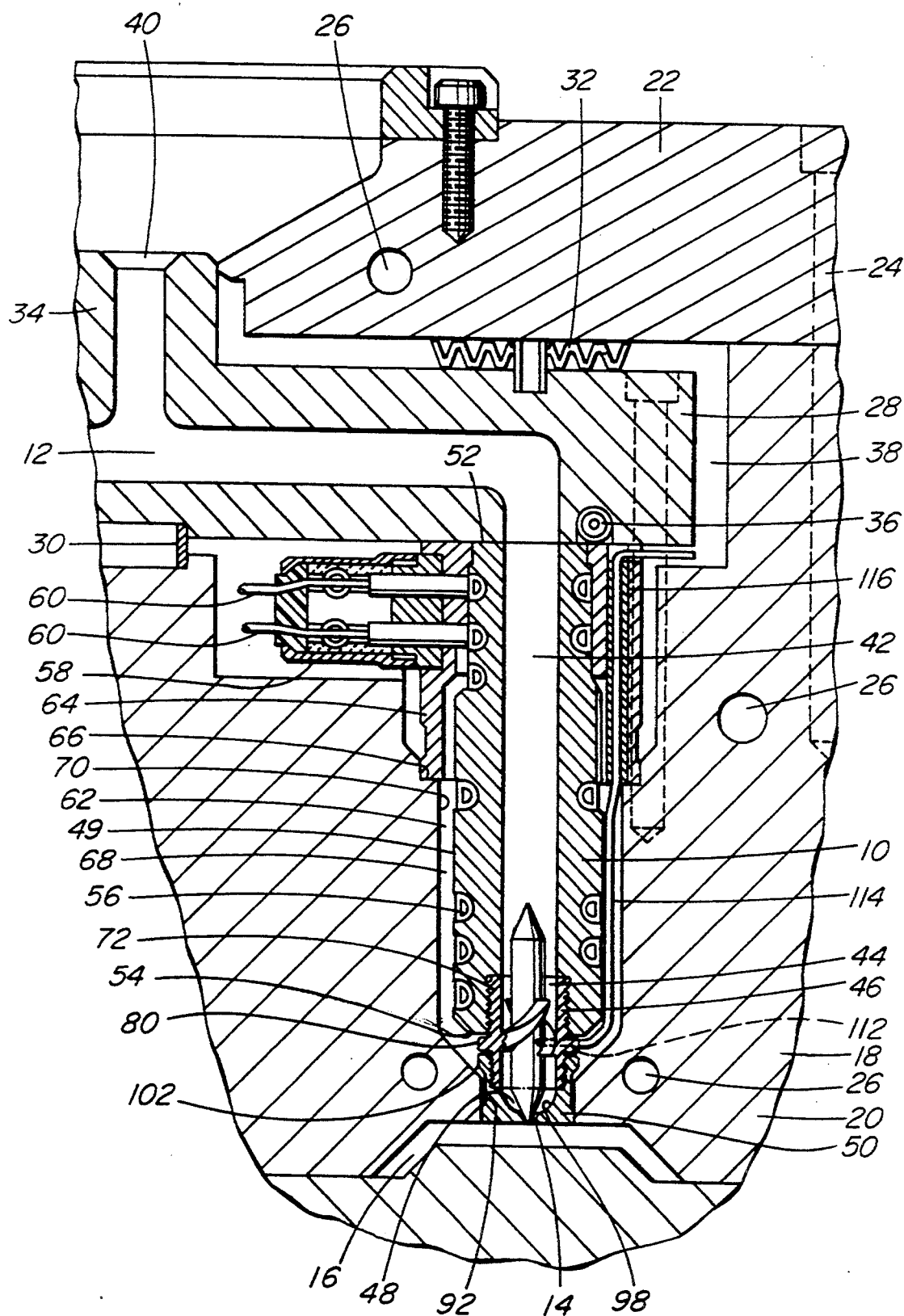
FIG. 1 is a partial sectional view of a portion of a multi-cavity injection molding system showing apparatus according to one embodiment of the invention.

Reference is first made to FIG. 1 which shows a portion of a multi-cavity injection molding system having several steel nozzles 10 to convey pressurized plastic melt through a melt passage 12 to respective gates 14 leading to different cavities 16 in the mold 18. In this particular configuration, the mold includes a cavity plate 20 and back plate 22 which are removably secured together by bolts 24. Other molds may include a variety of other plates or parts, depending upon the application. The mold 18 is cooled by pumping cooling water through cooling conduits 26 extending in the cavity plate 20 and the back plate 22. An electrically heated steel melt distribution manifold 28 is mounted between the cavity plate 20 and back plate 22 by a central locating ring 30 and insulative and resilient spacer members 32. The melt distribution manifold 28 has a cylindrical inlet portion 34 and is heated by an integral electrical heating element 36. An insulative air space 38 is provided between the heated manifold 28 and the surrounding cooled cavity plate 20 and back plate 22.

The melt passage 12 receives melt through a central inlet 40 in the inlet portion 34 of the manifold 28 and branches outward in the manifold 28 to pass through a central bore 42 in each nozzle 10. The melt passage 12 then extends through an aligned melt conduit 44 through a first insert 46 and then through an aligned central opening 48 through a second insert 50 according to the invention. As described in more detail below, in this embodiment of the invention, the first insert 46 is a torpedo insert and the second insert 50 is a gate insert.

Each nozzle 10 has a rear end 52 and a front end 54. The nozzle 10 is heated by an integral electrical heating element 56 which extends around the melt bore 42 to an external terminal 58 to which electrical leads 60 from a power source are connected. The nozzle 10 is seated in a well 62 in the cavity plate 20 with a cylindrical insulating and locating flange 64 extending forwardly to a circular locating shoulder 66 in the well 62. Thus, an insulative air space 68 is provided between the inner surface 70 of the well 62 and the outer surface 49 of the nozzle 10 to provide thermal separation between the heated nozzle 10 and the surrounding cooled mold 18.

Figure 2:
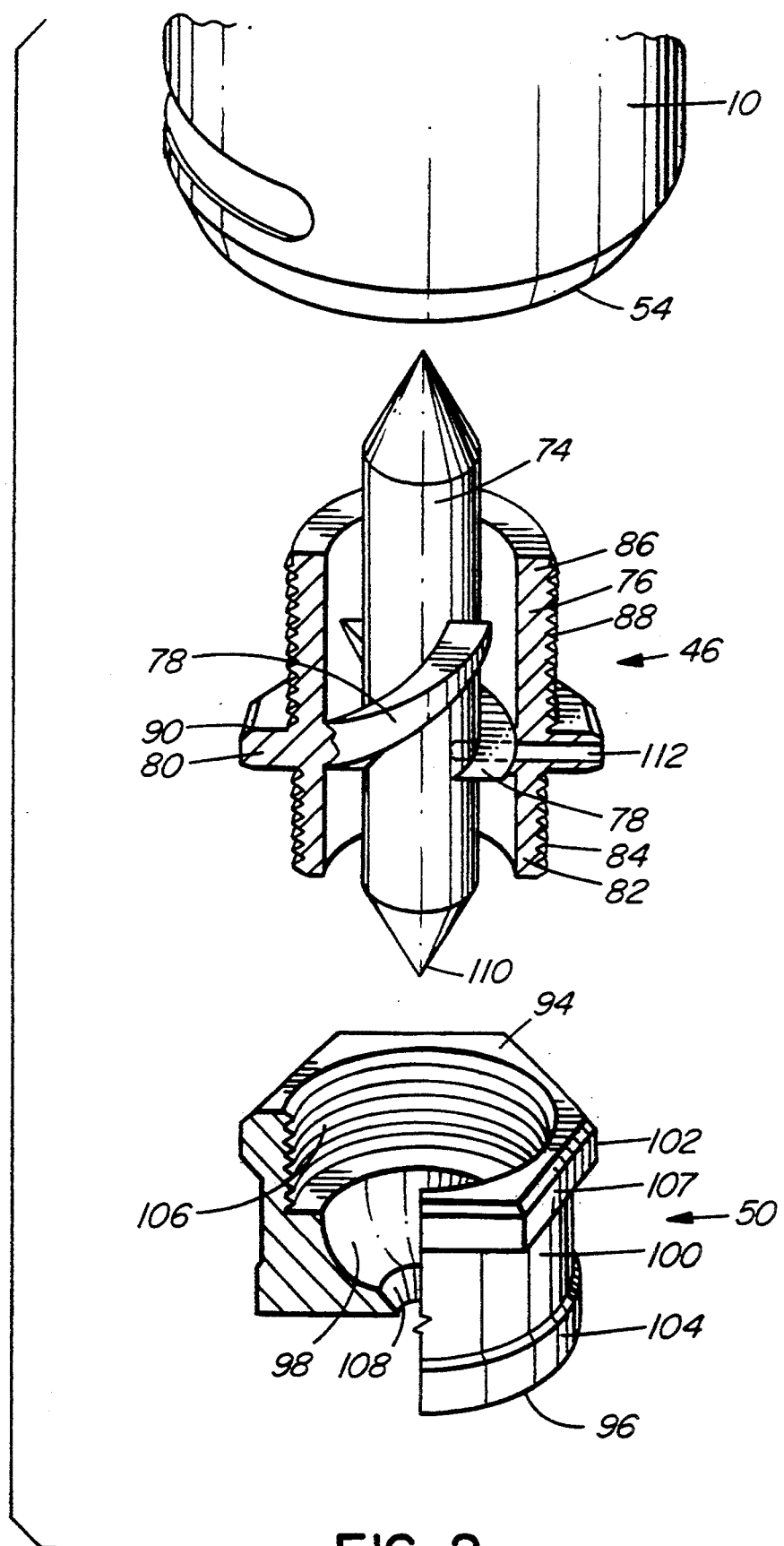
FIG. 2 is an exploded isometric view showing the two inserts in position to be mounted in place in the front end of the nozzle.

The front end 54 of the nozzle 10 has a threaded seat 72 extending around the central melt bore 42. As best seen in FIG. 2, the torpedo insert 46 has an elongated central shaft 74 extending centrally through an outer collar 76 with the melt conduit 44 extending therebetween. In this embodiment, the central shaft 74 is connected to the outer collar 76 by a pair of spiral blades 78 extending across the melt conduit 44, but in other embodiments one or more support members such as pins or straight fins can be used instead. The outer collar 76 of the torpedo insert 46 has a hexagonal shaped intermediate portion 80 between a cylindrical front portion 82 with a threaded outer surface 84 and a cylindrical rear portion 86 with a threaded outer surface 88. The rear portion 86 screws into the threaded seat 72 extending around the central melt bore 42 at the front end 54 of the nozzle 10. In this position, the melt conduit 44 through the torpedo insert 46 is in alignment with the central melt bore 42 through the nozzle. Also, the intermediate portion 80 of the outer collar 76 of the torpedo insert 46 is in the air space 68 around the nozzle 10 and has symmetrical flat outer faces 90 extending therearound for engagement by a wrench or other suitable tool to securely tighten the torpedo insert 46 into place.

In this embodiment, a cylindrical opening 92 extends through the mold 18 from the well 62 to the cavity 16. The gate insert 50 has a rearward end 94, a forward end 96, an inner surface 98, and an outer surface 100. The gate insert 50 has a hexagonal shaped engagement portion 102 adjacent the rearward end 94. The outer surface 100 of the gate insert 50 has a cylindrical portion 104 adjacent the forward end 96. The inner surface 98 has a threaded portion 106 extending to the rearward end 94 which screws onto the threaded outer surface 84 of the front portion 82 of the torpedo insert 46. In this Assembled position, the hexagonal shaped engagement portion 102 of the gate insert 50 which has symmetrical flat outer faces 107 is also in the air space 68 around the nozzle 10 for engagement by a wrench or other suitable tool to tighten it into place. The cylindrical portion 104 of the outer surface 100 fits in sealing contact in the cylindrical opening 92 with the forward end 98 of the gate insert 50 forming a portion of the cavity 16. The width of the cylindrical portion 104 in contact with the surrounding mold 18 is designed to provide optimum heat transfer therebetween for the particular application. The inner surface 98 of the gate insert 50 also has an inwardly tapered portion 108 which encircles a tapered tip 110 of the central shaft 74 of the torpedo insert 46. The tapered portion 108 of the inner surface 98 of the gate insert 50 is spaced a predetermined distance from the tapered front tip 110 of the central shaft 74 of the torpedo insert 46 to form the gate 14 of a predetermined size therebetween. While a hot tip gate 14 is shown, in other embodiments it can be a ring gate. As can be seen in FIG. 1, the inner surface 98 curves gradually inward to the tapered portion 108 so the central opening 48 through the gate insert 50 as well as the rest of the melt passage 12 does not have any sharp corners or dead spots. In this embodiment, a thermocouple bore 112 extends radially inward into the torpedo 46 through the outer collar 76 and one of the spiral blades 78 into the central shaft 74. A thermocouple element 114 is received in the thermocouple bore 112 to accurately monitor the operating temperature. The thermocouple element 114 extends rearwardly through the air space 68 and out through a hollow thermocouple tube 116. Thus, the thermocouple element 114 is easily removable, and in the event of leakage of melt into the air space 68, it will freeze off around the thermocouple element 114 in the thermocouple tube 116 to prevent leakage into the rest of the system.

In use, the injection molding system is assembled as shown in FIG. 1. The gate insert 50 is normally first mounted on the torpedo insert 46 and then both of them are tightened into place at the front end 54 of the nozzle 10. While only a single cavity 16 has been shown for ease of illustration, it will be appreciated that the melt distribution manifold 28 normally has many more melt passage branches extending to numerous cavities 16 depending on the application. Electrical power is applied to the heating element 36 in the manifold 28 and to the heating elements 56 in the nozzles 10 to heat them to a predetermined operating temperature. Heat from the heating element 56 in each nozzle 10 is conducted forwardly through the torpedo shaft 74 to the tapered front tip 110 extending into the gate 14. Pressurized melt from a molding machine (not shown) is then injected into the melt passage 12 through the central inlet 40 according to a predetermined cycle in a conventional manner. The pressurized melt flows through the melt bore 42 of each nozzle, through the melt conduit 44 between the spiral blades 94 of the torpedo insert 46, through the aligned central opening 48 in the gate insert 50, to the gate 14 to the cavity 16. The flow between the fixed spiral blades 78 of the torpedo insert 46 imparts a swirling motion to the melt which is accelerated as the melt approaches the gate 14 and results in the melt flowing outward in the cavity 16 near the gate 14 with a curving motion. This avoids unidirectional molecular orientation of the melt, at least adjacent the gate 14, and provides a stronger product in the gate area. After the cavities 16 are filled, injection pressure is held momentarily to pack and then released. After a short cooling period, the mold is opened to eject the molded products. After ejection, the mold is closed and injection pressure is reapplied to refill the cavities 16. This injection cycle is continuously repeated with a frequency dependent on the size and shape of the cavities 16 and the type of material being molded.

If the gate 14 plugs, it is relatively simple to open the mold 18 and remove the torpedo insert 46 and gate insert 50 for cleaning. In fact, both of them can be removed at the same time by unscrewing with a wrench. After cleaning, they can be replaced and retightened into place. One or both of the torpedo insert 46 or gate insert 50 can similarly be easily replaced if worn or corroded or a different size or type of gate is required.

Figure 3:
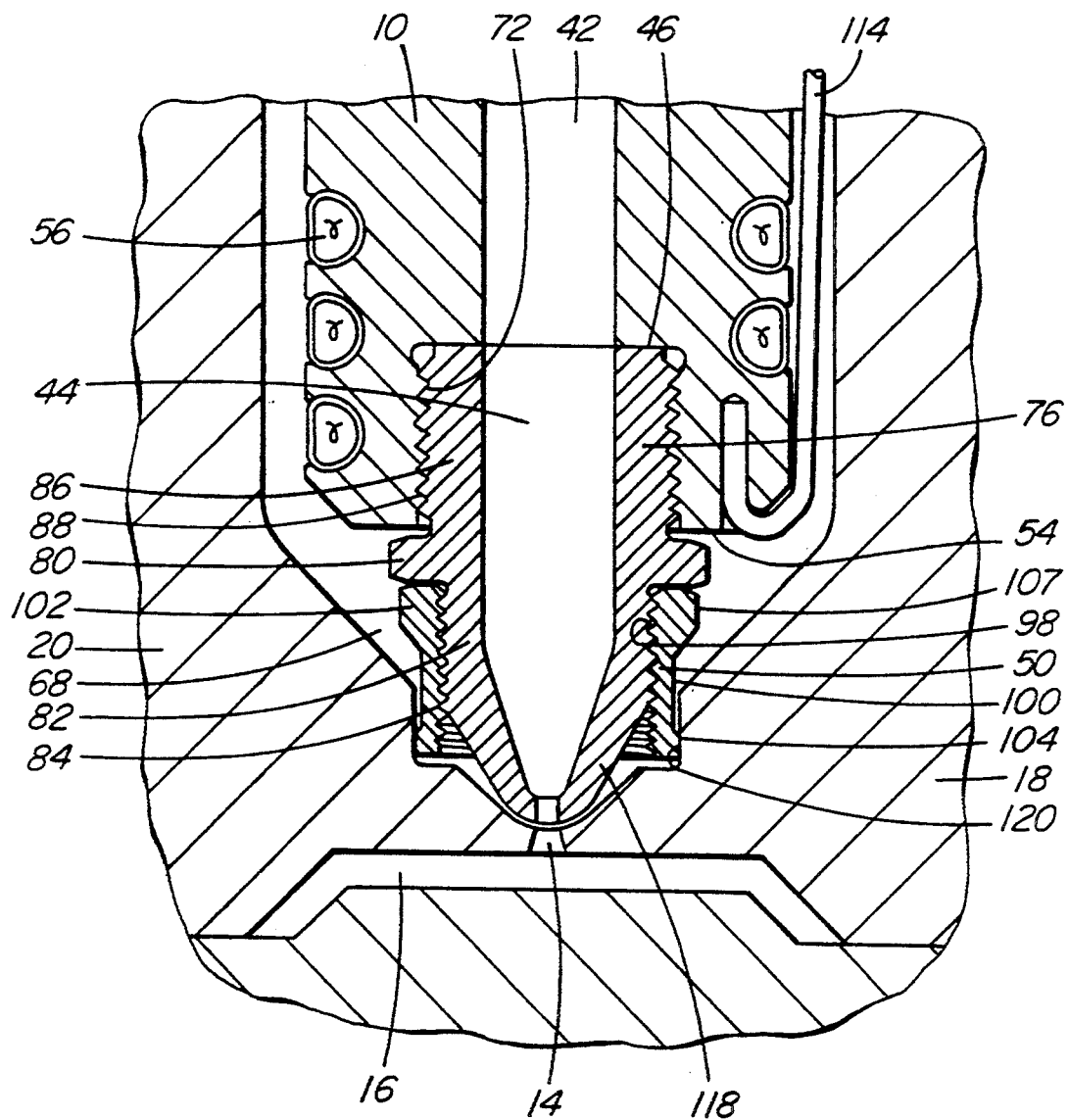
FIG. 3 is a sectional view of a portion of a heated nozzle from a similar system showing apparatus according to another embodiment of the invention.

Reference is now made to FIG. 3 which shows another embodiment of the invention. Most of the elements are common to the description given above, although their configuration has changed somewhat. Common elements are described and illustrated using the same reference numerals. The nozzle 10 is identical to that described above, except that the thermocouple bore 112 is machined to extend rearwardly from the front end 54. In this embodiment, the first insert 46 is not a torpedo insert and the second insert 50 is not a gate insert. Rather the first insert 46 has nose portion 118 which tapers inwardly and forwardly from the outer collar 76. The melt conduit 44 through the first insert 46 tapers inwardly in the nose portion 118 into alignment with the gate 14 which extends through the mold 18 to the cavity 16. The first insert 46 has an outer collar 76 with an intermediate engagement portion 80 extending between a rear portion 86 with a threaded outer surface 88 and a front portion 82 with a threaded outer surface 84.

The second insert 50 is generally cylindrical with a threaded inner surface 98. The cylindrical portion 104 of the outer surface 100 is received in sealing contact in a cylindrical seat 120 in the mold 18. The threaded inner surface 98 of the second insert 50 is screwed onto the threaded outer surface 84 of the front portion 82 of the first insert 46, and the threaded outer surface 88 of the rear portion 86 of the first insert 46 is then screwed into the threaded seat 72 at the front end 54 of the nozzle 10. The first and second inserts 46, 50 are then tightened into place by applying a wrench to the flat outer faces 107 of the hexagonal engagement portion 102 of the second insert 50. Thus, in the assembled position shown, the first and second inserts 46, 50 together provide a seal against leakage of melt into the insulative air space 68 around the nozzle 10. In this position, both of the hexagonal engagement portions 80, 102 are positioned in the air space 68 between the nozzle 10 and the mold 18. This provides easy access for engagement by a wrench of the engagement portion 102 of the second insert 50 for insertion and the engagement portion 80 of the first insert 46 for removal.

While the description of the nozzle seal according to the invention has been given with respect to preferred embodiments, it will be evident that various other modifications are possible without departing from the scope of the invention as understood by those skilled in the art and as defined in the following claims.

The embodiments of the invention in which an exclusive property or privilege is claimed is defined as follows:

1. In an injection molding apparatus comprising at least one heated nozzle having a rear end, a front end, and a central melt bore extending therethrough from the rear end to the front end, the at least one heated nozzle being seated in a surrounding cooled mold with an insulative air space extending between the at least one heated nozzle and the surrounding cooled mold and the central melt bore of the nozzle extending in alignment with a gate to a cavity, a first insert having an outer collar with a threaded rear portion, an intermediate portion, and a melt conduit therethrough, the threaded rear portion of the outer collar of the first insert being removably received in a threaded seat in the front end of the at least one nozzle with the melt conduit through the first insert in alignment with the central melt bore of the nozzle, the intermediate portion of the outer collar of the first insert having a plurality of symmetrical flat outer faces extending therearound, the intermediate portion extending in the air space between the at least one nozzle and the mold for engagement by a suitable tool to rotate the first insert for removable mounting in the threaded seat in the front end of the at least one nozzle, and a second insert having a rearward end, a forward end, and a central opening extending therethrough from the rearward end to the forward end, the forward end of the second insert being located in the mold with the central opening through the second insert also in alignment with the central melt bore of the nozzle, the improvement comprising;

the outer collar of the first insert having a threaded front portion, the second insert having a threaded surface to engage the threaded front portion of the outer collar of the first insert, and the second insert having an engagement portion with a plurality of symmetrical flat outer faces extending therearound adjacent the rearward end, the engagement portion extending in the air space between the at least one nozzle and the mold for engagement by a suitable tool to rotate the second insert relative to the first insert for removable connection to the threaded front portion of the outer collar of the first insert.

2. Injection molding apparatus as claimed in claim 1 wherein the front portion of the outer collar of the first insert has a threaded outer surface and the second insert has an inner surface with a matching threaded portion extending from the rearward end, whereby the second insert is removably mounted on the threaded front portion of the outer collar of the first insert.

3. Injection molding apparatus as claimed in claim 2 wherein the first insert is a torpedo insert having an elongated central shaft and at least one blade extending between the central shaft and the outer collar with the melt conduit extending around the elongated central shaft.

4. Injection molding apparatus as claimed in claim 3 wherein the elongated central shaft of the torpedo insert has a forwardly extending tapered front tip, the second insert is a gate insert with an outer surface having a cylindrical portion adjacent the forward end sealingly received in a matching cylindrical opening in the mold with the forward end of the gate insert forming a portion of the cavity, and the inner surface of the gate insert having an inwardly tapered portion adjacent the forward end, the inwardly tapered portion extending around the tapered front tip of the central shaft of the torpedo insert and being spaced a predetermined distance therefrom to form a gate therebetween.

5. Injection molding apparatus as claimed in claim 2 wherein the gate extends through the mold to the cavity, the first insert has a nose portion tapered inwardly and forwardly from the outer collar thereof, the melt conduit through the first insert tapers inwardly in the nose portion into alignment with the gate through the mold, and the second insert is generally cylindrical with the forward end of the second insert sealingly received in a cylindrical seat extending around the gate through the mold.

* * * * *